(12) United States Patent
Hu et al.

(10) Patent No.: US 12,155,575 B2
(45) Date of Patent: Nov. 26, 2024

(54) EXTRACTION DEVICE, EXTRACTION METHOD, AND EXTRACTION PROGRAM

(71) Applicant: NIPPON TELEGRAPH AND TELEPHONE CORPORATION, Tokyo (JP)

(72) Inventors: Bo Hu, Musashino (JP); Atsutoshi Kumagai, Musashino (JP); Kazunori Kamiya, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 339 days.

(21) Appl. No.: 17/624,578

(22) PCT Filed: Jul. 12, 2019

(86) PCT No.: PCT/JP2019/027814
§ 371 (c)(1),
(2) Date: Jan. 4, 2022

(87) PCT Pub. No.: WO2021/009818
PCT Pub. Date: Jan. 21, 2021

(65) Prior Publication Data
US 2022/0272045 A1    Aug. 25, 2022

(51) Int. Cl.
*H04L 47/2441* (2022.01)
*H04L 41/16* (2022.01)

(52) U.S. Cl.
CPC .......... *H04L 47/2441* (2013.01); *H04L 41/16* (2013.01)

(58) Field of Classification Search
CPC ... H04L 47/2441; H04L 41/16; H04L 43/022; H04L 43/028; H04L 43/16; H04L 47/83; H04L 47/823; H04L 63/0227
See application file for complete search history.

(56) References Cited

U.S. PATENT DOCUMENTS

| | | | |
|---|---|---|---|
| 2017/0149808 A1* | 5/2017 | Hamada | H04L 12/66 |
| 2017/0279698 A1* | 9/2017 | Sartran | H04L 43/0876 |
| 2020/0036611 A1* | 1/2020 | Lu | H04L 43/062 |
| 2020/0112574 A1* | 4/2020 | Koral | G06F 16/245 |

FOREIGN PATENT DOCUMENTS

WO    2015/194604 A1    12/2015

OTHER PUBLICATIONS

Chawla et al., "SMOTE: Synthetic Minority Over-sampling Technique", Journal of Artificial Intelligence Research, 2002, vol. 16, pp. 321-357.

* cited by examiner

*Primary Examiner* — Jung H Park
(74) *Attorney, Agent, or Firm* — XSENSUS LLP

(57) ABSTRACT

An extraction device includes processing circuitry configured to generate a first feature vector that shows a feature of traffic data for each target from a plurality of traffic data pieces aggregated for each predetermined target, sample traffic data from the traffic data for each target a plurality of times, and generate a second feature vector that shows a feature of the sampled traffic data for each sample set obtained.

19 Claims, 6 Drawing Sheets

| Class | Target i | Bag $r_i$ of network flows (ts, sip, dip, sp, dp, pr, pkt, byt) |
|---|---|---|
| Malicious | Server m1 | 8:00:00, m1, $C_1$, 80, 20000, tcp,1, 100<br>8:00:00, $C_2$, m1, 30000, 80, udp,2, 500<br>... |
| | Server m2 | ... |
| | ... | ... |
| Benign | Server b1 | 8:00:00, b1, $C_1$, 80, 20000, tcp,1, 500<br>8:05:00, $C_1$, b1, 30000, 80, tcp,1, 50<br>... |
| | Server b2 | ... |
| | ... | ... |

EXTRACTION DEVICE, EXTRACTION METHOD, AND EXTRACTION PROGRAM

CROSS-REFERENCE TO RELATED APPLICATION

The present application is based on PCT filing PCT/JP2019/027814, filed Jul. 12, 2019, the entire contents of which are incorporated herein by reference.

TECHNICAL FIELD

The present invention relates to an extraction device, an extraction method, and an extraction program.

BACKGROUND ART

Techniques for applying supervised learning to an NW flow are conventionally known. For example, there is a known technique of performing machine learning with use of learning data made up of feature amounts generated from traffic-related data for each of various hosts.

CITATION LIST

Non Patent Literature

[NPL 1] Nitesh V. Chawla, Kevin W. Bowyer, Lawrence O. H all, W. Philip Kegelmeyer, "SMOTE: Synthetic Minority Over-sampling Technique", Journal of Artificial Intelligence Research 16 (2002) 321-357 Submitted 09/01; published 06/02

SUMMARY OF THE INVENTION

Technical Problem

However, conventional techniques have a problem that it is sometimes difficult to obtain a sufficient number of feature amounts from traffic data. For example, in order to train a model for classifying whether traffic is benign or malicious, data on traffic known to be benign or malicious is required. On the other hand, malicious traffic is rare, and it may not be possible to collect a sufficient amount of data, for example. As a result, a sufficient number of feature amounts cannot be obtained, and the accuracy of the model also may decrease.

Means for Solving the Problem

In order to solve the foregoing problems and achieve the object, an extraction device includes: processing circuitry configured to generate a first feature vector that shows a feature of traffic data for each target from a plurality of traffic data pieces aggregated for each predetermined target; sample traffic data from the traffic data for each target a plurality of times; and generate a second feature vector that shows a feature of the sampled traffic data for each sample set obtained.

Effects of the Invention

According to the present invention, a sufficient number of feature amounts can be obtained from traffic data.

DESCRIPTION OF EMBODIMENTS

Hereinafter, embodiments of an extraction device, an extraction method, and an extraction program according to the present application will be described in detail with reference to the drawings. Note that the present invention is not limited to the embodiments described below.

Figure 1:
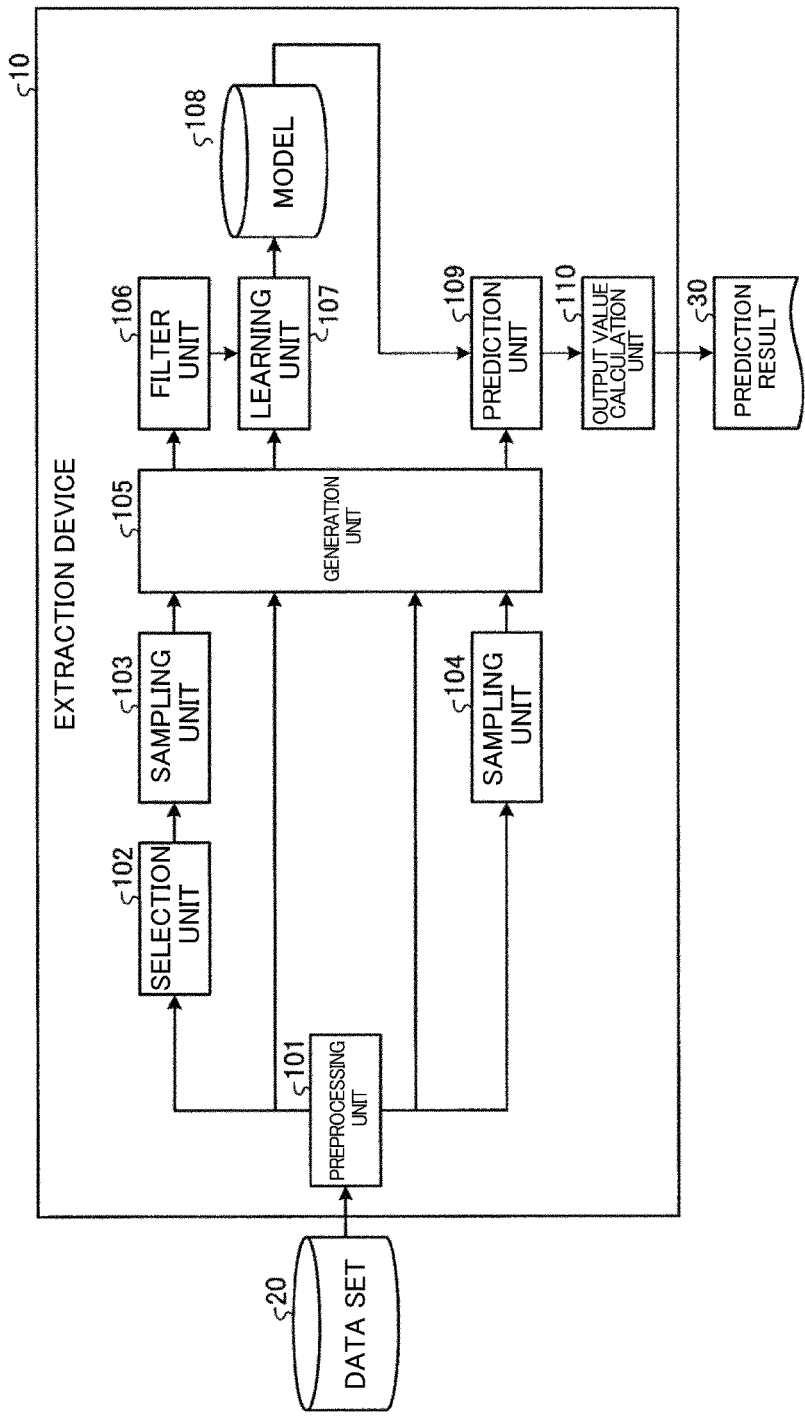
FIG. 1 is a diagram showing a configuration example of an extraction device according to a first embodiment.

[Configuration of first embodiment] First, the configuration of an extraction device according to a first embodiment will be described with reference to FIG. 1. FIG. 1 is a diagram showing an example of the configuration of the extraction device according to the first embodiment. As shown in FIG. 1, an extraction device 10 receives an input of a data set 20 and outputs a prediction result 30.

In this embodiment, the extraction device 10 will be described as being capable of generating feature vectors (feature amounts) and performing learning and prediction using the generated feature vectors. However, the extraction device 10 only needs to be able to at least generate feature vectors. For example, another device may receive the feature vectors generated by the extraction device 10 and use the received feature vectors for learning and prediction.

The data set 20 is a set of traffic data pieces. For example, traffic data is information obtained from NW flows. However, the traffic data is not limited to being information obtained from NW flows, and may be any data as long as it is based on network-related information. Also, in some cases, classes have been set in advance for traffic flows. The set classes are used as a label when performing model training.

Figures 2, 3:
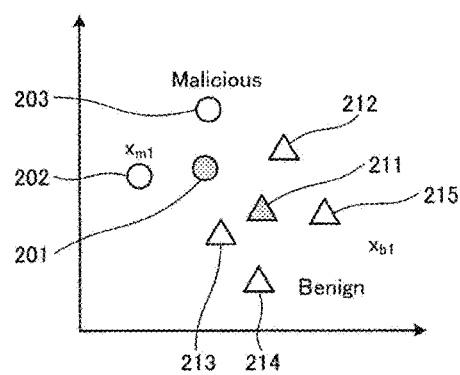
FIG. 2 is a diagram showing an example of traffic data.
FIG. 3 is a diagram for describing a feature vector.

FIG. 2 is a diagram showing an example of traffic data. For example, as shown in FIG. 2, for each NW flow, the traffic data includes a time stamp (ts), a source IP address (sip), a destination IP address (dip), a source port number (sp), a destination port number (dp), a protocol (pr), a number of packets (pkt), and a number of bytes (byt). Also, either "malicious" or "benign" has been set as the class for each traffic data piece in some cases.

The traffic data in FIG. 2 includes NW flows (Bag $r_i$ of network flows) that have been aggregated for each target $r_i$. Note that processing for aggregation will be described later. Also, the targets in this case are source or destination hosts.

Units of the extraction device 10 will now be described. As shown in FIG. 2, the extraction device 10 includes a preprocessing unit 101, a selection unit 102, a sampling unit 103, a sampling unit 104, a generation unit 105, a filter unit 106, a learning unit 107, a model 108, a prediction unit 109, and an output value calculation unit 110.

The model 108 is a model for predicting whether traffic is malicious or benign based on feature vectors generated from traffic data. Also, the extraction device 10 can train the model 108 using pieces of traffic data whose classes are known.

The preprocessing unit 101 can divide the data set 20 into training data and prediction data. For example, the preprocessing unit 101 can use the labeled traffic data in the data set 20 as training data, and use the unlabeled data as prediction data. Note that whether learning or prediction is to be performed may be determined in advance, and in this case, the preprocessing unit 101 does not need to separate the data.

The preprocessing unit 101 aggregates the traffic data in the data set 20 for each predetermined target. The target is a host or a flow, for example. For example, if the target is a host, the preprocessing unit 101 aggregates traffic data having a common source IP address or destination IP address in the same set (Bag).

For example, in the example of FIG. 2, the preprocessing unit 101 aggregates traffic data whose source IP address or destination IP address is m1 in a Bag $r_{m1}$. Further, the preprocessing unit 101 aggregates traffic data whose source IP address or destination IP address is b1 in a Bag $r_{b1}$.

The selection unit 102 selects a target. For example, if the target is a host, the selection unit 102 selects servers in the order of server m1, server m2, . . . , server b1, server b2, and so on. Also, if the target is a flow, the selection unit 102 sequentially selects a combination of 5-tuple values.

Here, the generation unit 105 generates a first feature vector that shows a feature of the traffic data for each target from the traffic data pieces aggregated for each predetermined target. In other words, the generation unit 105 can generate the first feature vector from the input traffic data itself. For example, if the function for generating the feature vector from the traffic data is $\varphi(\ )$, the generation unit 105 calculates $\varphi(r_{m1})$, $\varphi(r_{b1})$, and the like.

The sampling unit 103 samples traffic data from the traffic data of each target a plurality of times. The sampling unit 103 can performing sampling a plurality of times with different sampling rates. Note that the sampling unit 103 may randomly perform sampling according to the sampling rate. Further, the sampling unit 103 may sample traffic data that has been sorted according to a predetermined rule at regular intervals according to the sampling rate.

The generation unit 105 can then generate a second feature vector that shows a feature of the sampled traffic data for each sample set obtained by the sampling unit 103. In this way, the generation unit 105 not only generates the first feature vector from the input traffic data itself, but also generates the second feature vector from the sampled traffic data.

FIG. 3 is a diagram for describing a feature vector. A vector 201 in FIG. 3 is the first feature vector when the target is the server m1. The vector 202 and the vector 203 are second feature vectors when the target is the server m1. In this way, when sampling is not performed, one feature vector is obtained when the target is the server m1, whereas multiple feature vectors can be obtained for the server m1 by performing sampling.

Similarly, a vector 211 is the first feature vector when the target is the server b1. Further, a vector 212, a vector 213, a vector 214, and a vector 215 are the second feature vectors when the target is the server b1. In this way, a plurality of feature vectors for the server b1 can also be obtained by performing sampling.

Note that in FIG. 1, in order to describe learning and prediction separately, the sampling unit 103 and the sampling unit 104 are represented by different blocks, but the sampling unit 104 performs the same processing as the sampling unit 103.

If the distance between a second feature vector and the first feature vector of the same target is greater than or equal to a predetermined threshold value, the filter unit 106 discards the second feature vector. This is because if the second feature vector obtained by performing sampling is too far from the first feature vector obtained from the original data, the feature of that data cannot be properly expressed.

The learning unit 107 trains the model 108 using the first feature vectors and the second feature vectors. In this case, as shown in FIG. 2, it is assumed that a label indicating "malicious" or "benign" is known for each host.

The prediction unit 109 inputs the first feature vectors and the second feature vectors of the traffic data into the trained model 108, and predicts a label indicating whether the traffic data is malicious or benign. The output value calculation unit 110 then ensembles the prediction results for the feature vectors using a predetermined method and outputs the result as the prediction result 30. For example, if the prediction unit 109 calculates a malicious score for each feature vector, the output value calculation unit 110 calculates the average of a score calculated from the first feature vector and scores calculated from the second feature vectors.

Figure 4:
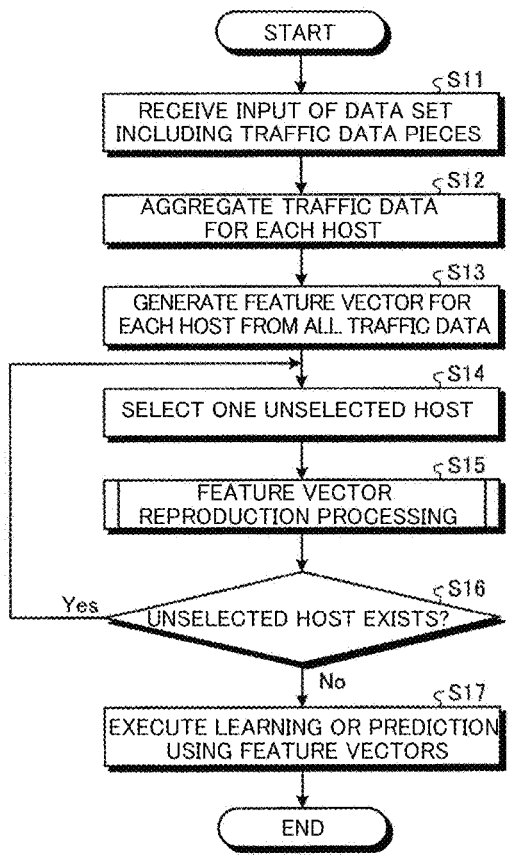
FIG. 4 is a flowchart showing a processing flow of the extraction device according to the first embodiment.

[Processing of the first embodiment] The processing flow of the extraction device 10 of the first embodiment will be described below with reference to FIG. 4. FIG. 4 is a flowchart showing a processing flow of the extraction device according to the first embodiment. First, as shown in FIG. 4, the extraction device 10 receives an input of a data set that includes a plurality of traffic data pieces (step S11). Next, the extraction device 10 aggregates traffic data for each host (step S12). The extraction device 10 then generates feature vectors for each host from all the traffic data pieces (step S13).

Here, the extraction device 10 selects one host from among hosts that have not been selected (step S14). The extraction device 10 performs feature vector reproduction processing for the selected host (step S15). The flow of feature vector reproduction processing will be described later.

Thereafter, if there is an unselected host (step S16, Yes), the extraction device 10 returns to step S14 and repeats the processing. On the other hand, if there are no unselected hosts (step S16, No), the extraction device 10 executes learning or prediction using the feature vectors (step S17).

Figure 5:
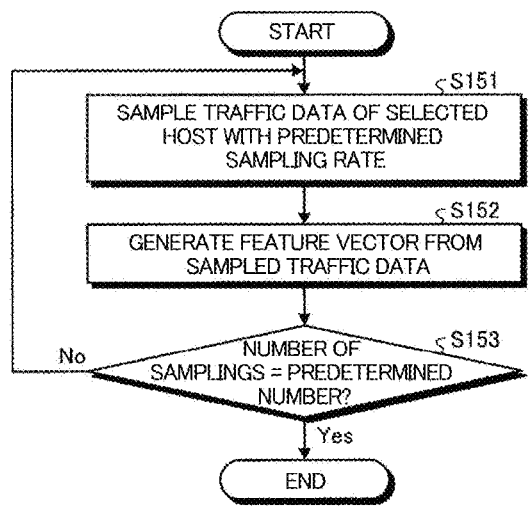
FIG. 5 is a flowchart showing a flow of feature vector reproduction processing.

The flow of feature vector reproduction processing (step S15 in FIG. 4) will be described below with reference to FIG. 5. FIG. 5 is a flowchart showing a flow of feature vector reproduction processing. As shown in FIG. 5, first, the extraction device 10 samples the traffic data of the selected host at a predetermined sampling rate (step S151).

Here, the extraction device 10 generates a feature vector from the sampled traffic data (step S152). Then, if the number of samplings has not reached a predetermined number (steps S153, No), the extraction device 10 returns to step S151 and repeats the processing. At this time, the extraction device 10 may change the sampling rate each time it is repeated by using a function that randomly generates a sampling rate. On the other hand, if the number of samplings has reached the predetermined number (step S153, Yes), the extraction device 10 ends the processing.

[Effects of first embodiment] As described above, the extraction device 10 generates a first feature vector that shows a feature of traffic data for each target from traffic data pieces aggregated for each predetermined target. The extraction device 10 samples the traffic data a plurality of times from the traffic data for each target. The extraction device 10 generates a second feature vector that shows a feature of the sampled traffic data for each sample set obtained by the sampling unit 103. In this way, although only one feature amount can originally be obtained for one target, the extraction device 10 can obtain a plurality of feature amounts by performing sampling. Therefore, according to the first embodiment, a sufficient number of feature amounts can be obtained from the traffic data.

The extraction device 10 generates a first feature vector for each host or each flow. Accordingly, the extraction device 10 can determine a unit according to which the feature amount is to be generated, in accordance with the target that is to be predicted to be malicious or benign.

The extraction device 10 performs sampling a plurality of times with different sampling rates. As a result, the extraction device 10 can give diversity to the second feature vectors and obtain more useful information from the second feature vectors.

If the distance between a second feature vector and the first feature vector of the same target is greater than or equal to a predetermined threshold value, the extraction device 10 discards that second feature vector. As a result, the extraction device 10 can improve the processing efficiency by excluding in advance a second feature vector that is not expected to contribute to an improvement in accuracy.

[Second Embodiment] The extraction device 10 is not required to generate a second feature vector for all of the targets. For example, the extraction device 10 may generate only the first feature vector if the quality of the traffic data meets a predetermined criterion. For example, the extraction device 10 generates a second feature vector if the accuracy of the model trained using the first feature amount vector is lower than a predetermined reference. In other words, the sampling unit 103 performs sampling only on targets for which the accuracy of the model learned using the first feature vector is lower than the predetermined reference.

Specifically, first, assume that a training data set 20 in which the labels for all traffic data pieces are known is given. At this time, the extraction device 10 generates the first feature vector from a certain percentage (e.g., 50%) of the traffic data of a certain target. The extraction device 10 then trains the model 108 using the generated first feature vector.

Then, the extraction device 10 inputs the traffic data that was not used for generating the first feature vector to the trained model 108, and predicts a label. If the label accuracy rate at this time is greater than or equal to a threshold value, the extraction device 10 determines that the quality of the traffic data included in the given data set 20 meets the criterion.

In this way, if the quality of the traffic data meets the criterion, the extraction device 10 does not generate a second feature vector. Therefore, in the second embodiment, the extraction device 10 only needs to generate the second feature vector when necessary, thus improving the efficiency of the processing.

Figure 6:
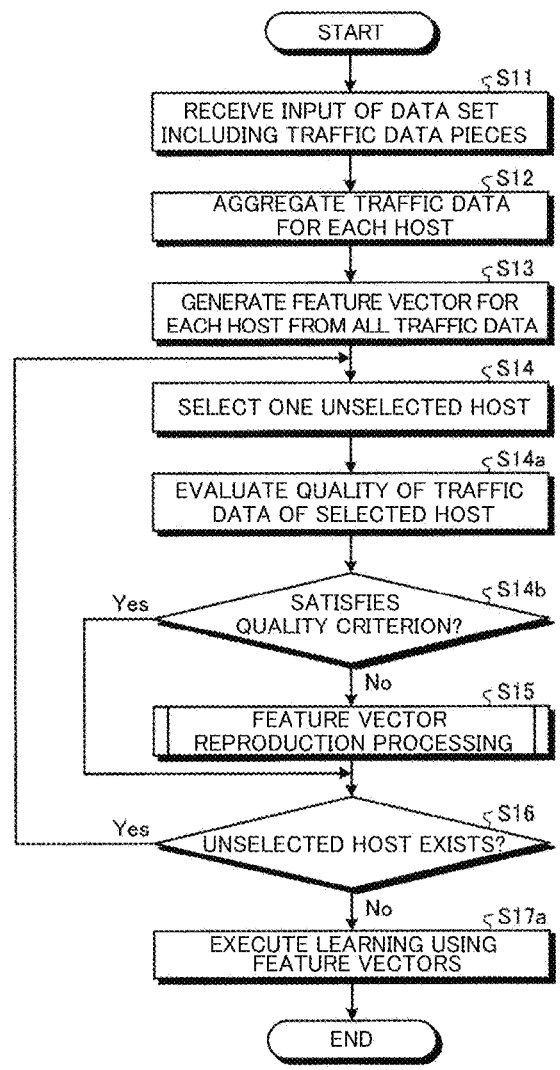
FIG. 6 is a flowchart showing a processing flow of the extraction device according to a second embodiment.

[Processing of second embodiment] A processing flow of the extraction device 10 of the second embodiment will be described below with reference to FIG. 6. FIG. 6 is a flowchart showing a processing flow of the extraction device according to the second embodiment. First, as shown in FIG. 6, the extraction device 10 receives an input of a data set that includes a plurality of traffic data pieces (step S11). Next, the extraction device 10 aggregates traffic data for each host (step S12). The extraction device 10 then generates feature vectors for each host from all the traffic data pieces (step S13).

Here, the extraction device 10 selects one host from among hosts that have not been selected (step S14). The extraction device 10 then evaluates the quality of the traffic data of the selected host (step S14*a*). The quality evaluation method is as described above.

If the traffic data does not meet the quality criterion (step S14*b*, No), the extraction device 10 performs feature vector reproduction processing for the selected host (step S15). On the other hand, if the traffic data meets the quality criterion (step S14*b*, Yes), the extraction device 10 does not perform the feature vector reproduction processing.

Thereafter, if there is an unselected host (step S16, Yes), the extraction device 10 returns to step S14, and the extraction device 10 repeats the processing. On the other hand, if there are no unselected hosts (step S16, No), the extraction device 10 executes learning using the feature vectors (step S17*a*).

[System configuration, etc.] The components of the illustrated devices are functional concepts, and do not necessarily need to be physically configured as shown in the figures. In other words, the specific forms of distribution and integration of the devices are not limited to the illustrations in the figures, and the devices may be entirely or partially distributed functionally or physically, or integrated with each other, in any unit in accordance with the load and usage condition. Further, the processing functions performed by the devices may be entirely or partially realized by a CPU and a program analyzed and executed by the CPU, or realized as hardware with wired logic.

Further, the processing described in the present embodiment as being performed automatically can be entirely or partially performed manually, and the processing described in the present embodiment as being performed manually can be entirely or partially performed automatically using a known method. Also, the processing procedures, control procedures, specific names, and information including various types of data and parameters shown in the above description and drawings can be changed as desired unless otherwise specified.

[Program] As one embodiment, the extraction device 10 can be implemented by installing an extraction program that executes the above extraction processing as package software or online software on a desired computer. For example, by causing an information processing device to execute the above extraction program, the information processing device can function as the extraction device 10. The information processing device referred to here includes a desktop-type or notebook-type personal computer. Other examples of information processing devices include smartphones, mobile communication terminals such as mobile phones and PHS (Personal Handyphone System) devices, and slate terminals such as PDAs (Personal Digital Assistants).

Further, the extraction device 10 can be implemented as an extraction server device that provides a service related to the above-described extraction processing to a client, which is a terminal device used by a user. For example, the extraction server device is implemented as a server device that provides an extraction service for receiving traffic data and outputting first feature amounts and second feature amounts. In this case, the extraction server device may be implemented as a web server, or may be implemented as a cloud that provides the above-described extraction processing service by outsourcing.

Figure 7:
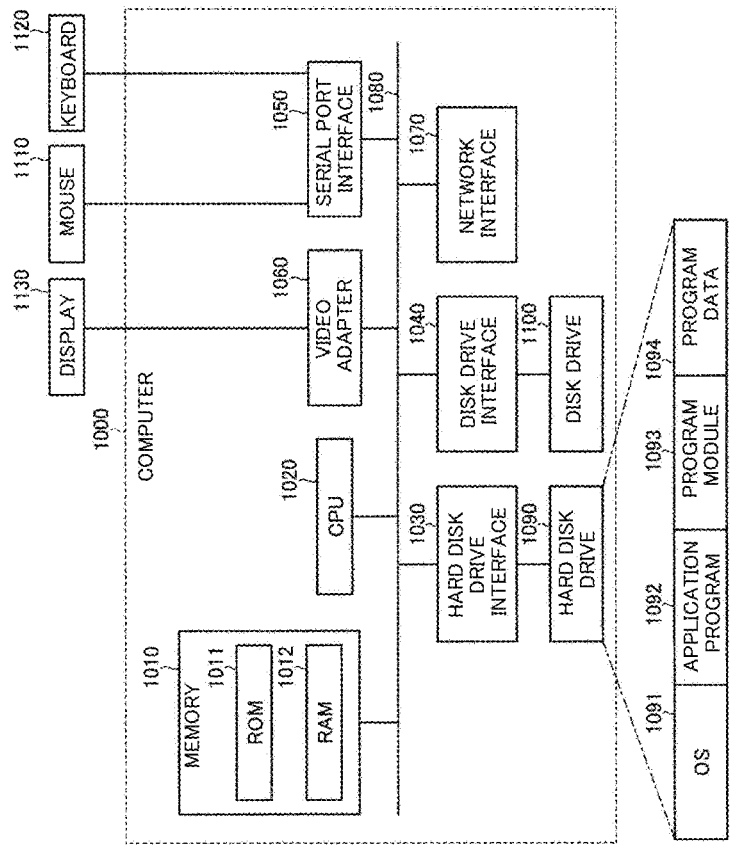
FIG. 7 is a diagram showing an example of a computer that executes an extraction program.

FIG. 7 is a diagram showing an example of a computer that executes the extraction program. A computer 1000 includes a memory 1010 and a CPU 1020, for example. The computer 1000 also includes a hard disk drive interface 1030, a disk drive interface 1040, a serial port interface 1050, a video adapter 1060, and a network interface 1070. These parts are connected by a bus 1080.

The memory 1010 includes a ROM (Read Only Memory) 1011 and a RAM 1012. The ROM 1011 stores a boot program such as a BIOS (Basic Input Output System), for example. The hard disk drive interface 1030 is connected to a hard disk drive 1090. The disk drive interface 1040 is connected to a disk drive 1100. A removable storage medium such as a magnetic disk or an optical disk is inserted into the disk drive 1100. The serial port interface 1050 is connected to a mouse 1110 and a keyboard 1120, for example. The video adapter 1060 is connected to a display 1130, for example.

The hard disk drive 1090 stores an OS 1091, an application program 1092, a program module 1093, and program data 1094, for example. Specifically, a program that defines the processing of the extraction device 10 is implemented as the program module 1093 in which code that can be executed by a computer is described. The program module 1093 is stored in the hard disk drive 1090, for example. For example, the program module 1093 for executing the same processing as the functional configuration in the extraction device 10 is stored in the hard disk drive 1090. Note that the hard disk drive 1090 may be replaced with an SSD.

Also, setting data used in the processing of the above-described embodiment is stored as the program data 1094 in the memory 1010 or the hard disk drive 1090, for example. The CPU 1020 reads the program module 1093 and the program data 1094 stored in the memory 1010 or the hard disk drive 1090 to the RAM 1012 as needed, and executes the processing of the above-described embodiment.

The program module 1093 and the program data 1094 are not limited to being stored in the hard disk drive 1090, and, for example, may be stored in a removable storage medium and read by the CPU 1020 via the disk drive 1100 or the like. Alternatively, the program module 1093 and the program data 1094 may be stored in another computer a via a network (LAN (Local Area Network), a WAN (Wide Area Network), or the like) The program module 1093 and the program data 1094 may be read by the CPU 1020 from the other computer via the network interface 1070.

REFERENCE SIGNS LIST

10 Extraction device
20 Data set
30 Prediction result
101 Preprocessing unit
102 Selection unit
103, 104 Sampling unit
105 Generation unit
106 Filter unit
107 Learning unit
108 Model
109 Prediction unit
110 Output value calculation unit

The invention claimed is:

1. An extraction device comprising:
processing circuitry configured to:
generate a first feature vector that shows a feature of traffic data for each target from a plurality of traffic data pieces aggregated for each predetermined target;
sample traffic data from the traffic data for each target a plurality of times; and
generate a second feature vector that shows a feature of the sampled traffic data for each sample set obtained,
wherein the processing circuitry is further configured to perform sampling on only a target for which an accuracy of a model learned using the first feature vector is lower than a predetermined reference from among targets.

2. The extraction device according to claim 1, wherein the processing circuitry is further configured to generate the first feature vector for each host or each flow.

3. The extraction device according to claim 1, wherein the processing circuitry is further configured to perform sampling a plurality of times with different sampling rates.

4. The extraction device according to claim 1, wherein the processing circuitry is further configured to discard a second feature vector if a distance between the second feature vector and the first feature vector of a same target is greater than or equal to a predetermined threshold value.

5. The extraction device according to claim 1, wherein the processing circuitry is further configured to randomly perform sampling according to the sampling rate.

6. The extraction device according to claim 1, wherein the processing circuitry is further configured to train the model using the first feature vector and the second feature vector to predict whether the traffic data is malicious or benign.

7. The extraction device according to claim 6, wherein the processing circuitry is further configured to calculate a score for each of the first feature vector and the second feature vector and output the calculated scores in a diagram.

8. The extraction device according to claim 7, wherein the processing circuitry is configured to generate the first feature vector by aggregating, for each target, the traffic data having a common server in a same set.

9. The extraction device according to claim 8, wherein the processing circuitry is further configured to:
select one server, among a plurality of servers, as the target server, and
differently display the feature vector of the target server from the feature vector of the other servers.

10. An extraction method comprising:
generating a first feature vector that shows a feature of traffic data for each target from a plurality of traffic data pieces aggregated for each predetermined target;
sampling traffic data from the traffic data for each target a plurality of times; and
generating a second feature vector that shows a feature of the sampled traffic data for each sample set obtained, by processing circuitry,
wherein the sampling is performed on only a target for which an accuracy of a model learned using the first feature vector is lower than a predetermined reference from among targets.

11. The extraction method according to claim 10, further comprising training the model using the first feature vector and the second feature vector to predict whether the traffic data is malicious or benign.

12. The extraction method according to claim 11, further comprising calculating a score for each of the first feature vector and the second feature vector and outputting the calculated scores in a diagram.

13. The extraction method according to claim 12, further comprising generating the first feature vector by aggregating, for each target, the traffic data having a common server in a same set.

14. The extraction method according to claim 13, further comprising:
selecting one server, among a plurality of servers, as the target server, and
differently displaying the feature vector of the target server from the feature vector of the other servers.

15. A non-transitory computer-readable recording medium storing therein an extraction program that causes a computer to execute a process comprising:
- generating a first feature vector that shows a feature of traffic data for each target from a plurality of traffic data pieces aggregated for each predetermined target;
- sampling traffic data from the traffic data for each target a plurality of times; and
- generating a second feature vector that shows a feature of the sampled traffic data for each sample set obtained,
- wherein the sampling is performed on only a target for which an accuracy of a model learned using the first feature vector is lower than a predetermined reference from among targets.

16. The non-transitory computer-readable recording medium according to claim 15, wherein the process further includes training the model using the first feature vector and the second feature vector to predict whether the traffic data is malicious or benign.

17. The non-transitory computer-readable recording medium according to claim 16, wherein the process further includes calculating a score for each of the first feature vector and the second feature vector and output the calculated scores in a diagram.

18. The non-transitory computer-readable recording medium according to claim 17, wherein the process further includes generating the first feature vector by aggregating, for each target, the traffic data having a common server in a same set.

19. The non-transitory computer-readable recording medium according to claim 18, wherein the process further includes:
- selecting one server, among a plurality of servers, as the target server, and
- differently displaying the feature vector of the target server from the feature vector of the other servers.

* * * * *